Dec. 6, 1938.   J. H. MARCHEK   2,139,310
DITCH BANK MOWING MACHINE
Filed Dec. 2, 1936    3 Sheets-Sheet 3
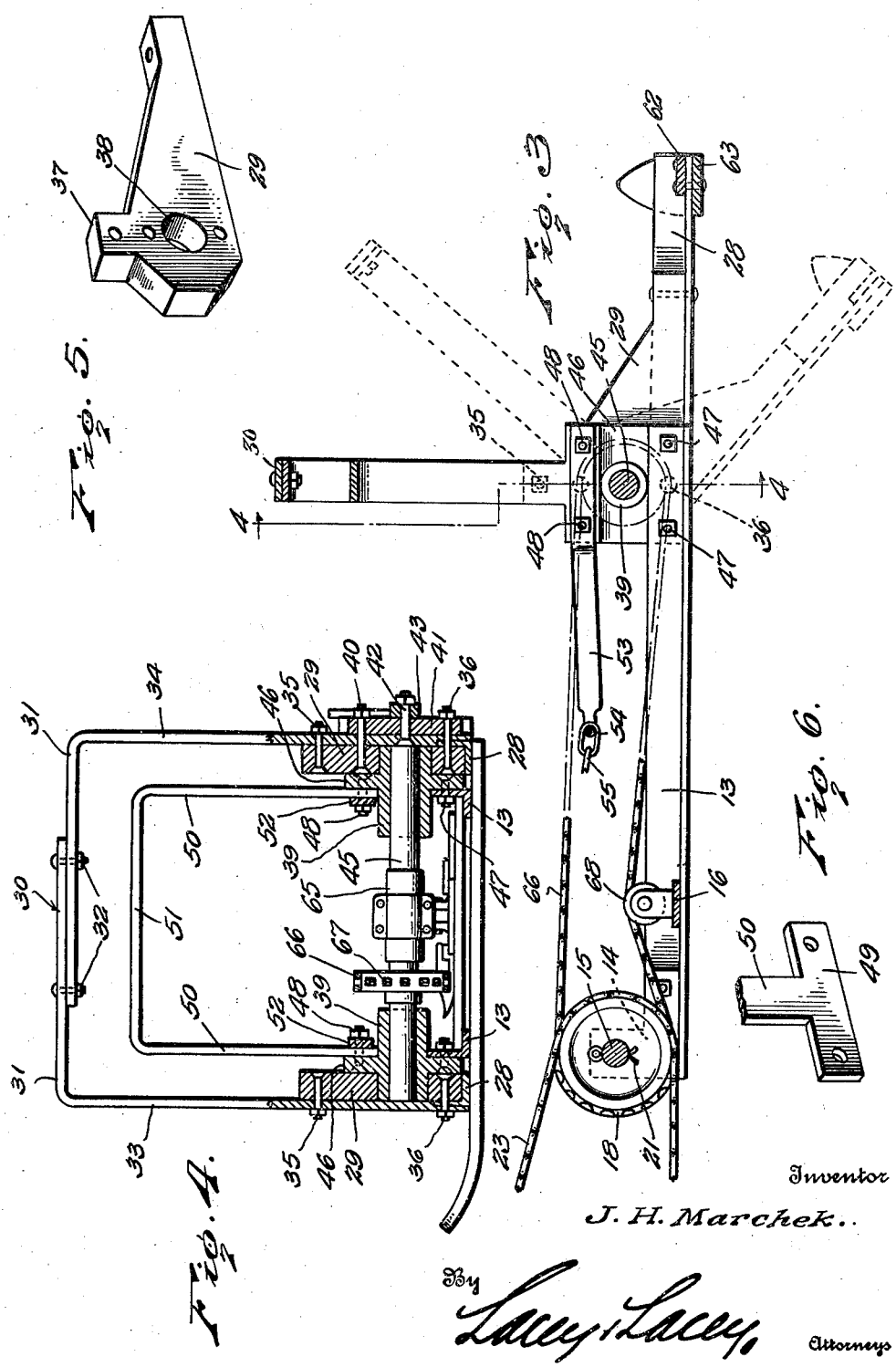
Inventor
J. H. Marchek..
By Lacey & Lacey,
Attorneys Patented Dec. 6, 1938

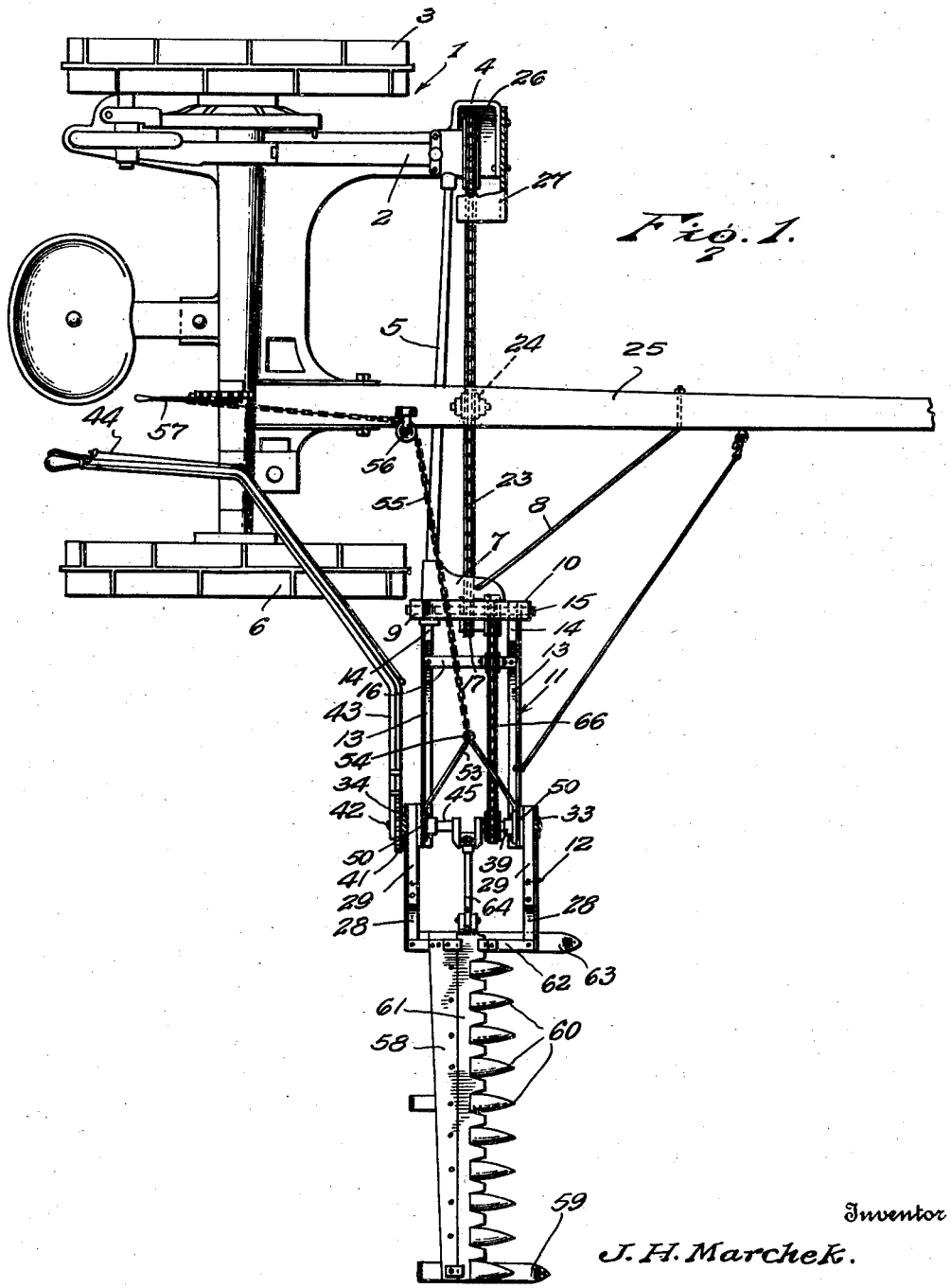

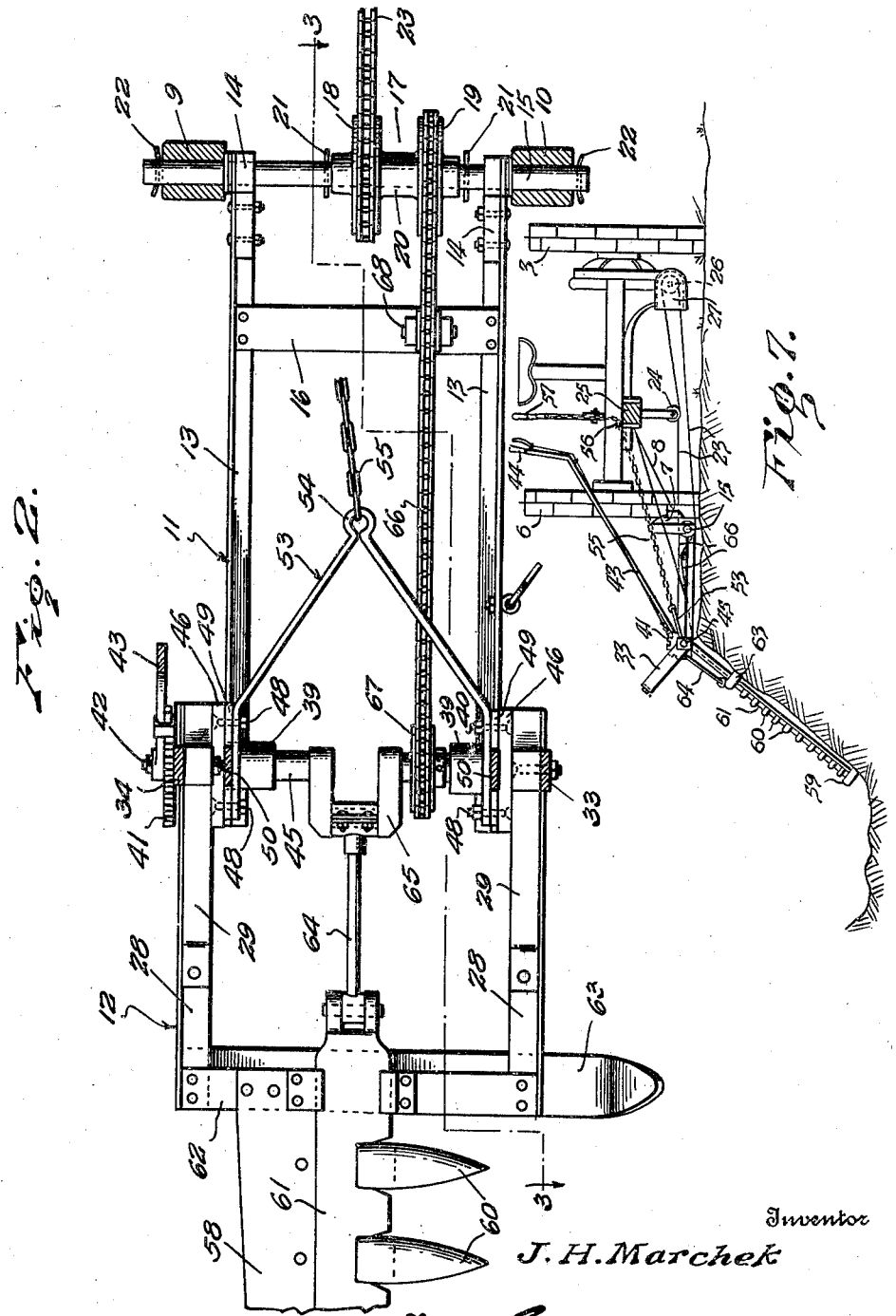

2,139,310

UNITED STATES PATENT OFFICE 2,139,310

DITCH BANK MOWING MACHINE

Joseph Howard Marchek, Homedale, Idaho, assignor of one-half to Lewis Toucher, Homedale, Idaho Application December 2, 1936, Serial No. 113,908

4 Claims. (Cl. 56—283)

This invention relates to mowing machines and more particularly to an attachment adapted to be applied to a mowing machine of a conventional construction in place of the usual cutting mechanism whereby a mowing machine of a conventional construction may be converted into a machine for mowing the banks of ditches such as used for drainage or irrigating purposes.

One object of the invention is to provide a mowing machine attachment of this character so constructed that when it is in use the mowing machine may be driven along the upper edge of a ditch bank and grass and other vegetation cut from the bank so that the vegetation will be prevented from obstructing the ditch.

Another object of the invention is to provide the attachment with a frame having a cutter bar carrying portions so mounted that it may be swung vertically and secured in an adjusted position in which it will substantially conform to the slope of a ditch bank and thus permit vegetation growing upon the bank of the ditch to be properly cut.

Another object of the invention is to so construct the frame that when it is in use it may be very easily applied in place of the usual cutter bar and in addition so mount the frame that it may be angularly adjusted to dispose it in proper spaced relation above the surface of the ground along which the mowing machine is driven at a side of a ditch.

Another object of the invention is to provide improved means for transmitting motion from the rotary shaft of the mowing machine to a crank shaft carried by the frame of the attachment and engaged by a pitman which reciprocates the cutting blade of the attachment when the mowing machine is in operation.

It is another object of the invention to provide a mowing machine attachment of this character which is simple in construction, very strong and durable and not liable to get out of order when in use.

The invention is illustrated in the accompanying drawings, wherein

Figure 1 is a top plan view showing the attachment applied to a mowing machine of a conventional construction, Figure 2 is a top plan view of the attachment with portions shown in section, Figure 3 is a sectional view taken longitudinally through the attachment upon the line 3—3 of Figure 2, Figure 4 is a transverse sectional view taken on the line 4—4 of Figure 3, Figure 5 is a perspective view of a mounting block constituting an element of the device, Figure 6 is a fragmentary perspective view of an element of the device, and Figure 7 is a view in front elevation showing the mowing machine in use.

The mowing machine to which the ditch bank cutting attachment is applied has been shown in top plan in Figure 1 and is of a conventional construction. This mowing machine is indicated in general by the numeral 1 and has the usual drive mechanism including a pitman drive shaft 2 which is located at the left hand side of the machine and has rotary motion imparted to it from the ground wheel 3 when the mowing machine is drawn forwardly. The drive shaft 2 extends forwardly into the guard 4 and from the forward end portion of the shaft housing extends the usual bar or rod 5 which projects in front of the right hand ground wheel 6 and carries a head or bearing bracket 7 which is braced, as shown at 8, and at its outer side is provided with the usual bearings 9 and 10. This bearing bracket or head 7 usually carries the sickle bar which is pivotally mounted in the bearings 9 and 10 in order that it may be swung vertically from a raised position to a lowered position for use, and the pitman drive shaft usually carries at its forward end a disk with which a pitman is eccentrically connected in order that reciprocating motion may be transmitted to the blades of the sickle bar. In order to equip the mower with the cutting mechanism constituting the subject-matter of this invention, the disk is removed from the forward end of the pitman drive shaft and the sickle bar removed from the head or bracket 7. The improved ditch bank cutting mechanism is then applied in a manner to be hereinafter specifically set forth and is driven from the pitman drive shaft. It will thus be seen that a mowing machine of a conventional construction can be very easily converted into a ditch bank mowing machine.

The ditch bank cutting mechanism has a frame including an inner section 11 and an outer section 12, and referring to Figure 2 it will be seen that the inner section of the frame has side bars 13 at the inner or rear ends of which are secured bearing blocks 14. These bearing blocks fit loosely about a shaft 15. The shaft 15 extends through the bearings 9 and 10 of the bracket or head 7 of the mowing machine, and in order to maintain the side bars 13 in proper spaced relation to dispose the bearing blocks 14 against inner ends of the bearings 9 and 10, there has been provided a bracing bar 16 which extends between the side bars 13 transversely thereof and has its ends bolted or otherwise firmly secured against the lower inwardly extending flanges of the side bars which are formed of angle iron. A double sprocket wheel 17 which consists of the two sprocket wheels 18 and 19 joined by a sleeve or neck 20 is rotatably mounted upon the shaft 15, and in order to maintain the double sprocket wheel in its proper position upon the shaft, cotter keys 21 are passed through openings formed diametrically of the shaft. Other cotter keys 22 are passed through ends of the shaft 15 which project from the bearings 9 and 10. It will thus be seen that, when applying the attachment to a mowing machine after the usual sickle bar has been removed, it is merely necessary to pass the shaft 15 through the bearings 9 and 10 with portions passing through the bearing blocks 14 and apply the double sprocket wheel to the shaft as it is shifted longitudinally into the position shown in Figure 2. The cotter keys may then be applied and the frame will be connected with the head or bearing bracket 7 and may be vertically adjusted by swinging the inner frame section about the shaft 15. The sprocket 18 is engaged by a sprocket chain 23 and this chain extends transversely of the mowing machine with one flight engaging the idler sprocket or roller 24 mounted upon the draft tongue 25 of the mowing machine. A sprocket wheel 26 is secured upon the forward end of the pitman drive shaft 2 in place of the usual disk which is removed and the sprocket chain 23 is trained about the sprocket wheel 26 in order that, when the mowing machine is moved forwardly, rotary motion may be transmitted by the chain 23 to the double sprocket 17. A guard 27 is secured upon the guard 4 and this guard 27 serves very effectively to prevent grass and other vegetation from becoming caught between the chain and the sprocket 26. The roller or idler sprocket 24 maintains the sprocket chain at the proper tension to rotate the double sprocket and eliminates likelihood of the sprocket chain slipping out of its proper engagement with either the sprocket wheel 26 or the sprocket wheel 18.

The outer section of the frame also has side bars 28 which are also formed of angle iron and these side bars 28 carry bearing blocks 29 formed of strong metal and bolted or otherwise secured upon the inwardly extending horizontal flanges of the side bars. A bracing yoke 30, which is of an inverted U-shaped formation and consists of companion members 31 folded together, as shown at 32, is disposed vertically over the inner or rear end portions of the outer frame section and has its depending arms 33 and 34 secured to the bearing block 29 by bolts 35 and 36 which pass through the lug 37 of the bearing block and through the lower portions of the bearing block. It should be noted that the blocks 29 are formed with bores 38 to receive the bearing sleeves 39 and that at one side of the front frame section the bearing block 29 is formed with an opening above its bore 38 to receive a bolt 40. This bolt 40 and the lower bolt 36 at this side of the frame are of such length that they may project outwardly from the arm 34 of the bracing yoke 30 and pass through a ratchet wheel 41 to secure the ratchet wheel in place against the arm 34. There has also been provided a bolt 42 extending through the arm 34 and the center of the ratchet wheel or disk 41 with an end portion projecting outwardly from the disk 41 and serving as a pivot for a latch lever 43. This latch lever 43 extends towards the inner end of the inner frame section 11 and then extends diagonally towards the rear of the mowing machine and terminates in a handle portion 44 which may be easily grasped by the operator of the mowing machine. In view of the fact that the lever is pivotally mounted upon the bolt 42, the operator of the mowing machine may release the tooth of the lever from the ratchet wheel, swing the lever upwardly and then engage the tooth of the lever with the front of the teeth of the ratchet wheel and by applying downward pressure upon the lever the outer frame member will be tilted about the bearing sleeve. Therefore, the outer frame member may be adjusted and disposed at a desired angle at which it will extend substantially parallel to the bank of a ditch. The bearing sleeves fit about a crank shaft 45 and each is provided with a collar in the form of a rectangular plate 46, the lower portion of which is secured against outer side faces of the vertical flanges of the side bars 13 of the rear frame section by bolts 47. Upper corner portions of the plate or collar 46 are also formed with openings to receive bolts 48 which extend through openings formed in ends of the cross heads 49 at lower ends of the arms 50 of a yoke or brace 51 which extends vertically under the brace 30. The upper bolts 48 also pass through end portions of the arms 52 of a yoke or bridle 53 formed of strong metal. This bridle 53 is substantially V-shaped and extends longitudinally over the inner frame section and terminates in an eye 54 with which one end of a chain 55 is connected. This chain extends longitudinally of the inner frame section and beyond the pivoted rear end thereof and may be engaged with a guide pulley 56 carried by the draft tongue 25 and then extended rearwardly and connected with a latch lever 57 or it may be engaged with a hook mounted upon the draft tongue at approximately the position of the pulley 56. This chain serves to support the forward end of the frame section 13 and by adjusting the chain the angle at which the inner frame section extends may be controlled. By this arrangement the inner frame section may be adjusted to dispose it either substantially horizontal with the ground over which the mowing machine is being drawn or it may be swung upwardly where it will be out of the way and allow the mowing machine to be transported from one place to another without likelihood of the cutting mechanism striking obstructions.

The cutter bar 58 is of a conventional construction such as used upon mowing machines and at one end carries the usual shoe 59 to rest upon the ground along the side of a ditch. The usual guard fingers 60 extend forwardly from the sickle bar and there has also been provided the usual reciprocating knives 61 which are to be reciprocated longitudinally of the sickle bar. At its inner end the sickle bar is secured upon a cross bar 62 which extends transversely thereof and is secured to outer ends of the side bars 28 of the outer frame section 12 over a shoe 63 which is secured against the under faces of the side bars 28 and projects forwardly from the outer frame section. A pitman 64 connects the inner end of the cutter bar 61 with the crank 65 of the crank shaft 45, and in order to rotate the crank shaft, there has been provided a sprocket chain 66 which is trained about the sprocket 19 and also engaged about a sprocket 67 carried by the crank shaft. This sprocket chain extends longitudinally of the inner frame section and its lower flight engages an idler pulley 68 which is secured upon the bracing bar 16 of the inner frame section and serves to tighten the sprocket chain and prevent it from slipping out of engagement with the sprocket wheels 19 and 67.

When this ditch-mowing attachment is in use, it is applied to a mowing machine of a conventional construction after the sickle bar of the mowing machine and the pitman and drive disk have been removed. The sprocket wheel 26 is applied to the forward end of the pitman drive shaft 2 and the shaft 15 mounted in the bearings 9 and 10 of the bracket or head 7. The inner frame section is held in a raised position by the chain 55 and the outer frame section carrying the sickle bar is swung upwardly by means of the lever 43 while traveling across a field to a ditch. When the ditch is reached, the inner frame section 11 is allowed to move downwardly by letting out the chain 55 until this frame section is substantially horizontal with the ground and the chain is then again secured. The outer frame section 12 is then allowed to swing downwardly until it extends substantially parallel to the front of the ditch with the shoes 63 and 59 resting upon the ditch bank. If it is found that the outer frame section and the sickle bar will not extend parallel to the ditch bank when the inner frame section is extending horizontally, the inner frame section may be again adjusted. After the outer frame section and the sickle bar have been disposed parallel to the ditch bank, the mowing machine is driven forwardly and as it moves forwardly along the ditch the sprocket wheel 26 will be rotated and rotation transmitted by means of the sprocket chain 23 to the double sprocket 17. The chain 66 transmits rotary motion from the sprocket 19 of the double sprocket to the sprocket wheel 67 fixed upon the crank shaft and, therefore, the crank shaft will be rotated and the pitman 64 will impart reciprocating motion to the cutter bar 61 so that the blades of the cutter will cut the grass between the fingers 60. In view of the fact that the shoes 63 and 59 rest upon the bank of the ditch, the cutter bar may follow irregularities in the ditch bank and the grass will be properly cut. Upon reaching the end of a ditch, the outer frame section may be swung upwardly by means of the lever 44. The ditch-cutting mechanism can be easily removed and the original cutter bar and operating means remounted.

Having thus described the invention, what is claimed as new is:

1. In combination with a mower including a wheeled frame, a pitman drive shaft rotatably carried by the wheeled frame and extending longitudinally thereof, a carrier extending transversely of the wheeled frame and projecting from a side of the mower, and a bearing head at the outer end of said carrier, a ditch-mowing mechanism comprising a frame extending transversely of the wheeled frame and having an inner section pivoted at its inner end to said bearing head for vertical swinging adjustment, an outer section, a crank shaft pivotally connecting the outer section to the outer end of the inner section for vertical swinging adjustment, a sickle bar extending from the outer frame section, a reciprocatory cutter carried by said sickle bar, a pitman between the crank shaft and said cutter, a sprocket wheel carried by the pitman drive shaft of said mower, a sprocket wheel carried by said crank shaft, and a sprocket chain for transmitting rotary motion from the sprocket wheel of the pitman drive shaft to the sprocket wheel of said crank shaft.

2. A ditch bank mowing attachment for a mowing machine including a pitman drive shaft and a sickle bar mounting having bearings carried thereby, said attachment comprising a frame having an inner section and an outer section, each section having side bars and adjoining ends of the sections having their side bars overlapped, a sickle bar extending from the outer end of the outer frame section, a cutter carried by said sickle bar, a mounting shaft at the inner end of the inner frame section adapted to engage through the bearings of the sickle bar mounting of the mowing machine and mount the inner frame section thereto, blocks carried by the inner end portions of the side bars of the outer frame section, bearings carried by the outer end portions of the side bars of the inner frame section and rotatably engaging said blocks to pivotally mount the outer frame section for vertical swinging adjustment, a crank shaft journaled in said bearings and extending across the inner section, a pitman between the crank shaft and said cutter, and means for transmitting rotary motion from the pitman drive shaft of the mowing machine to the crank shaft.

3. A ditch bank mowing attachment for a mowing machine including a pitman drive shaft and a sickle bar mounting having bearings carried thereby, said attachment comprising a frame having an inner section and an outer section, a sickle bar extending from the outer end of the outer frame section, a cutter carried by said sickle bar, a mounting shaft at the inner end of the inner frame section adapted to engage through the bearings of the sickle bar mounting of the mowing machine and mount the inner frame section thereto, blocks carried at opposite sides of the inner end portion of the outer frame section, bearings carried at opposite sides of the outer end portion of the inner frame section and rotatably engaging said blocks to pivotally mount the outer frame section for vertical swinging adjustment, a crank shaft extending transversely across the outer end of the inner section and journaled in said bearings, a pitman between the crank shaft and said cutter, a bearing yoke straddling the outer frame section and having arms secured to the blocks, a ratchet wheel secured to one arm of said yoke, a latch lever pivoted at the center of said ratchet wheel and having a tooth for engaging the ratchet wheel whereby upon manipulating the lever the outer frame section may be swung vertically about the bearings to an adjusted position, and means for transmitting rotary motion from the pitman drive shaft of the mowing machine to the crank shaft.

4. A ditch bank mowing attachment for a mowing machine including a pitman drive shaft and a sickle bar mounting having bearings carried thereby, said attachment comprising a frame having an inner section and an outer section, a sickle bar extending from the outer end of the outer frame section, a cutter carried by said sickle bar, a mounting shaft at the inner end of the inner frame section adapted to engage through the bearings of the sickle bar mounting of the mowing machine and mount the inner frame section thereto, blocks carried by the inner end portion of the outer frame section and extending upwardly therefrom, bearings carried by the outer end portion of the inner frame section and extending upwardly therefrom and rotatably engaging said blocks to pivotally mount the outer frame section for vertical swinging adjustment, a crank shaft journaled in said bearings and extending transversely across the inner section, a pitman between the crank shaft and said cutter, a bracing yoke straddling the outer end portion of the inner frame section and having arms secured to said bearings, a second bracing yoke straddling the inner end portion of the outer section and disposed over the first yoke and having arms secured to outer faces of the blocks, a bridle disposed horizontally over the inner frame section and having arms secured to the arms of the first-mentioned yoke, a chain extending from said bridle towards and beyond the inner end of the inner section and adapted to be connected with a portion of a mowing machine and adjusted longitudinally to draw upon the bridle and swing the inner frame section vertically about the mounting shaft to an adjusted position, and means for transmitting rotary motion from the pitman drive shaft of the mowing machine to the crank shaft.

JOSEPH HOWARD MARCHEK.